May 2, 1967  S. G. ENDERS  3,317,076
PLASTIC CASE
Filed May 26, 1964  3 Sheets-Sheet 1
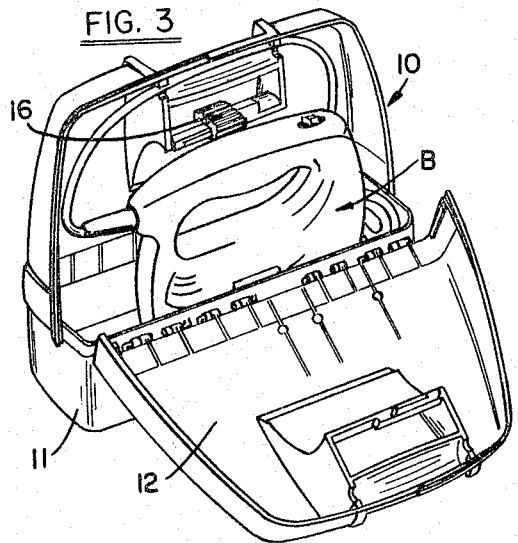
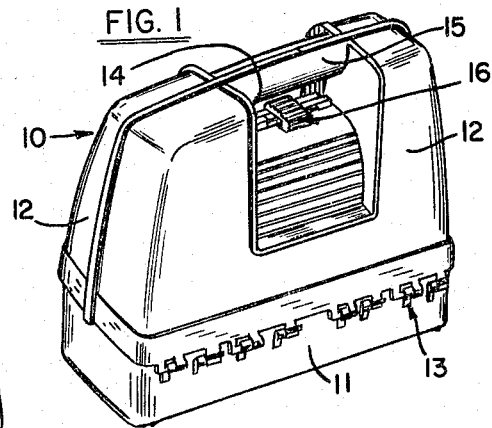
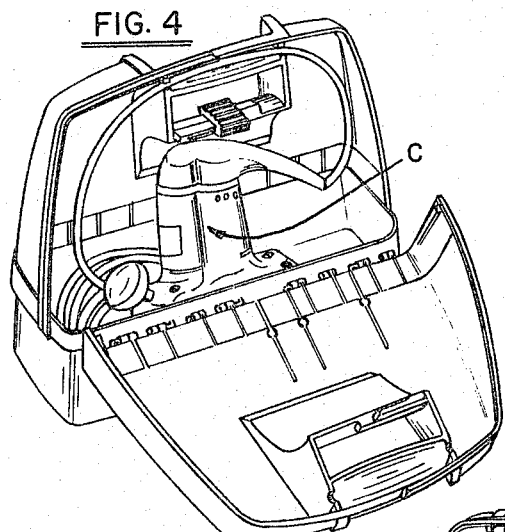
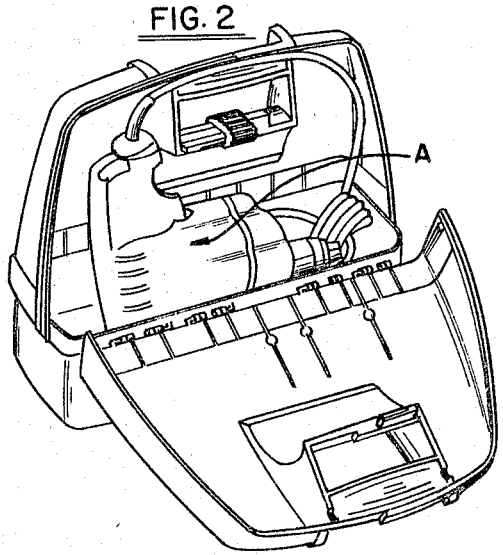
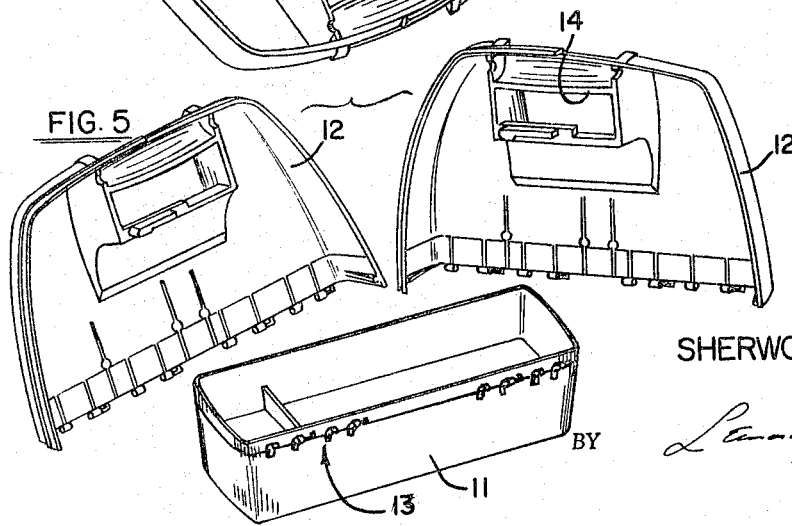
INVENTOR
SHERWOOD G. ENDERS
BY
ATTORNEY

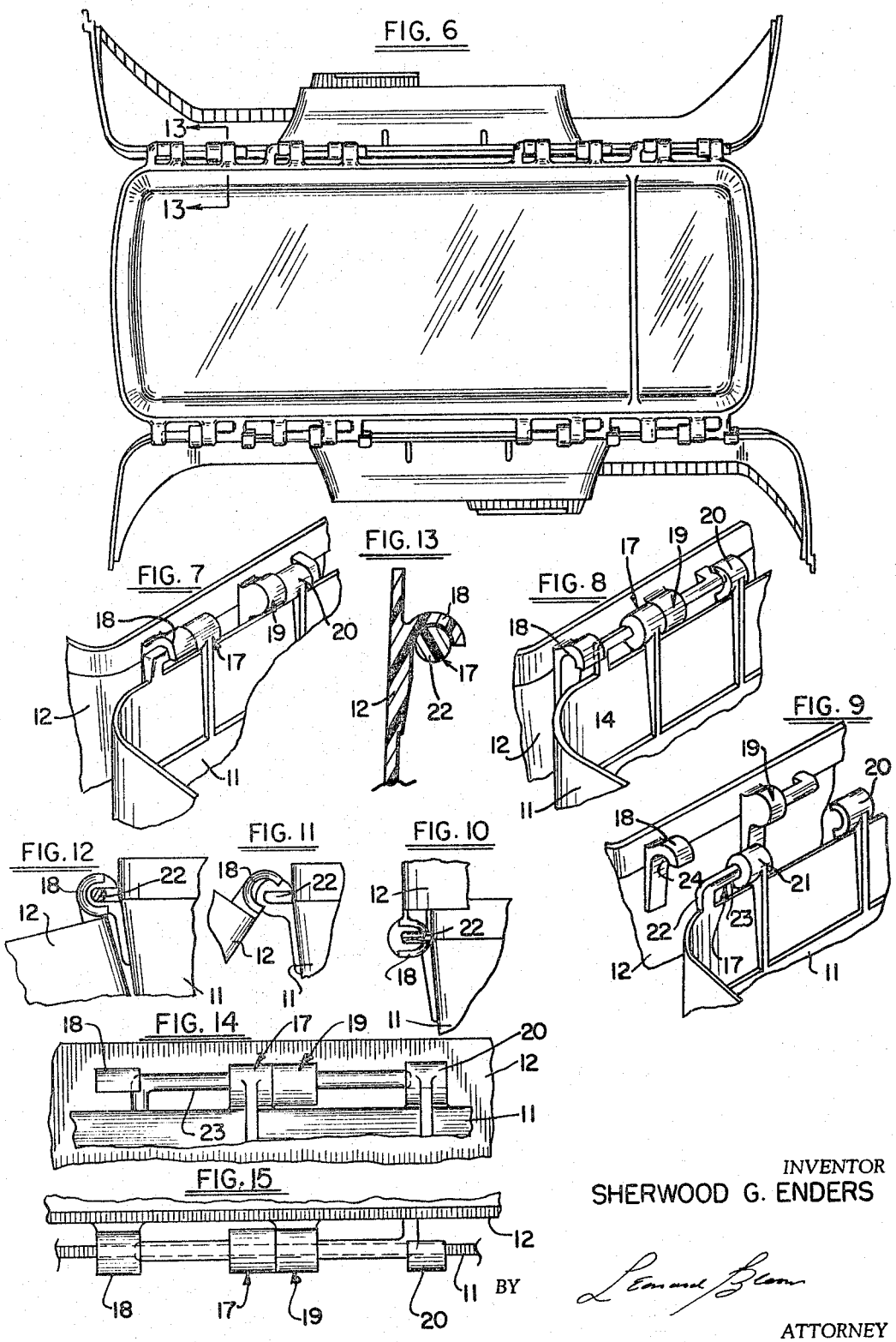

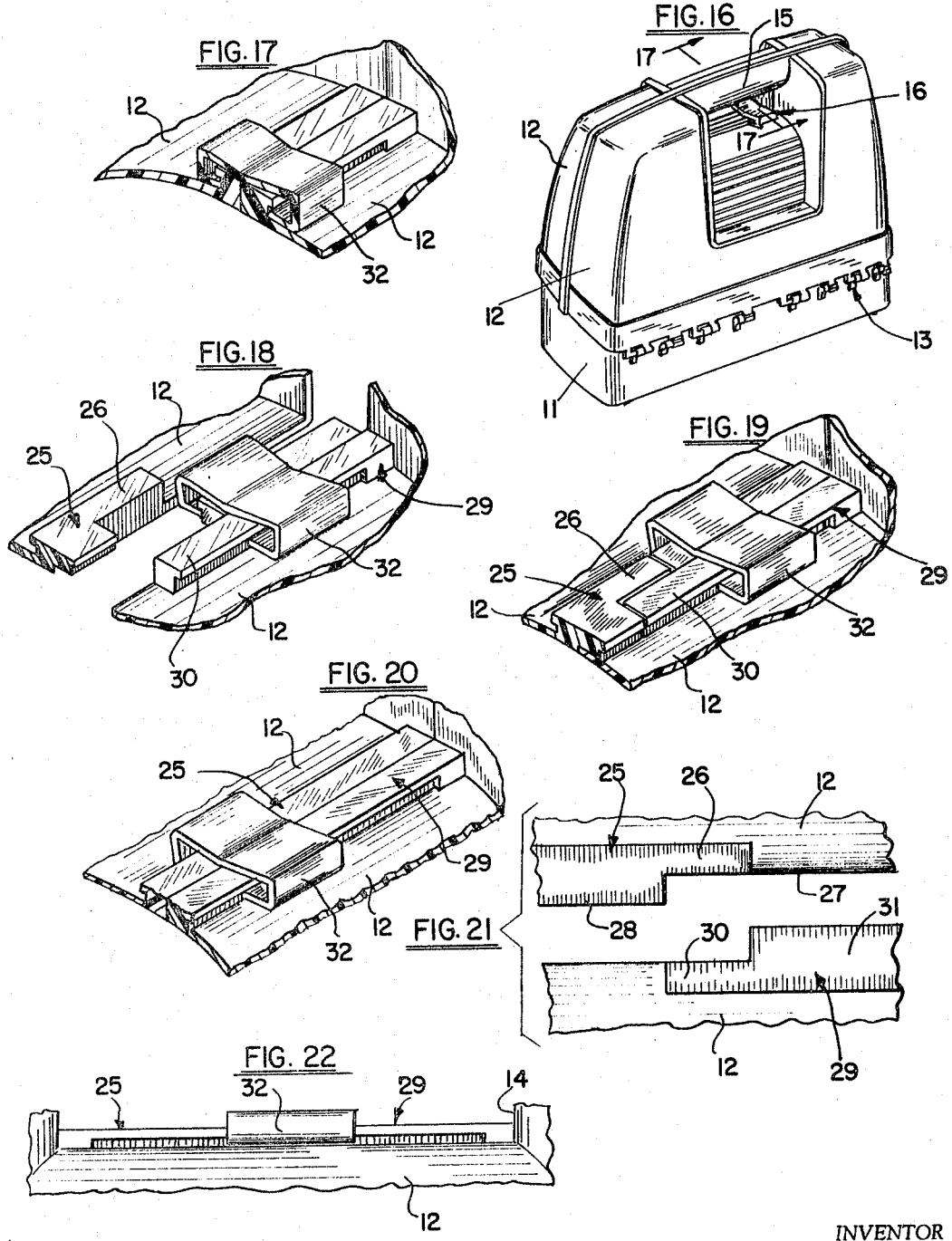

United States Patent Office 3,317,076
Patented May 2, 1967

3,317,076
PLASTIC CASE
Sherwood G. Enders, Bowleys Quarters, Baltimore, Md., assignor to The Black and Decker Manufacturing Company, Towson, Md., a corporation of Maryland
Filed May 26, 1964, Ser. No. 370,238
6 Claims. (Cl. 220—31)

The present invention relates to a plastic case, and more particularly, to a case that may be economically molded from readily-available materials.

It is an object of the present invention to provide a plastic case that may be used, for example as a tool kit, in which only two dies or molds are required, one for the tray member, and the other for the identical side members, and in which the resultant molded plastic pieces may be detachably secured together without any additional hardware.

It is another object of the present invention to facilitate the use of economical molds that have simple cavities and do not require any side pulls.

It is yet another object of the present invention to provide a plastic case comprising a tray member, two identical side members serving as covers, a unique integrally-molded hinge means between each side member and a respective longitudinal side edge of the tray, complementary recesses formed near the top of each side member to form a top handle for the case, and a unique latching means including a sliding latch located below the top handle of the case.

It is a further object of the present invention to provide, for use in conjunction with a plastic case, a unique hinge means between the tray member and each respective side member, which requires (for a separation between the members) that the side member first be pivoted by a desired degree down towards the tray member, next longitudinally slid with respect to the tray, and then snapped out to overcome a slight interference fit between at least one set of respective hinge elements.

These and other objects of the present invention will become apparent from a reading of the following specification, taken in conjunction with the enclosed drawings, in which:

FIGURE 1 is a perspective of the plastic case in its closed and latched position;

FIGURE 2 is a perspective of the case of FIGURE 1, but showing one of the side members of the case opened to reveal a portable electric drill that may be stored or carried in the case;

FIGURE 3 is a corresponding respective, showing a portable electric jig saw that may be housed within the case;

FIGURE 4 is a further corresponding perspective, showing a portable electric sander that may be housed within the case;

FIGURE 5 is an exploded perspective showing the bottom tray member and the two identical side members that serve as covers for the tray;

FIGURE 6 is a top plan view of the tray, showing a portion of the respective side members pivoted down towards the tray, and further showing one of side members moved longitudinally with respect to the tray;

FIGURE 7 is a partial perspective of the hinge in assembled relationship;

FIGURE 8 is a partial perspective corresponding to that of FIGURE 7, but showing the side member moved longitudinally with respect to the tray to expose the complementary hinge elements and retainers;

FIGURE 9 is an exploded partial perspective, showing the members separated one from another;

FIGURES 10–12 are end elevations of one of the hinge elements and its cooperating retainer, showing the manner in which the side member may be pivoted down towards the tray member to clear the hinge element from its respective retainer;

FIGURE 13 is a section view taken along the lines 13—13 of FIGURE 7;

FIGURE 14 is a front elevation of the hinge in the exposed position of FIGURE 8;

FIGURE 15 is a top plan view corresponding to that of FIGURE 14, showing that the exposed hinge elements preferably have a slight interference fit which may be manually over-ridden;

FIGURE 16 is a perspective view of the overall case, corresponding to that of FIGURE 1, but showing the case in its unlatched position;

FIGURE 17 is a fragmentary perspective of the latching means of the present invention;

FIGURE 18 is a corresponding exploded perspective of the latching means;

FIGURE 19 corresponds to FIGURE 18, but shows how the two side members are brought together so that their respective complementary lands mate with one another;

FIGURE 20 corresponds to FIGURE 19, but shows the sliding latch adjusted to hold the complementary lands together in the latched position of the case;

FIGURE 21 is a top plan view of the respective complementary lands separated from one another; and FIGURE 22 is a front elevation of the latching means in its engaged position.

With reference to the drawings, there is illustrated a plastic case 10 which comprises a tray member 11 and a pair of identical side members 12 serving as covers for the case. The case may be used as a tool kit, for example, having a portable electric drill A (FIGURE 2), a jig saw B (FIGURE 3), or a sander C (FIGURE 4). Each of the side members 12 is hinged along its bottom edge to a respective one of the longitudinal side edges of the tray, the improved hinging means being denoted as at 13. Moreover, each of the side members 12 is recessed near its top, as at 14, with the recesses being complementary to one another to form an upper handle 15. A latching means, as at 16, is located below the upper handle for holding the two side members together.

The hinge means 13, preferably comprises a first hinge element 17, see FIGURE 9, formed integrally with one of the members (either the tray 11 or side member 12), a complementary first retaining element 18 formed integrally with the other member, and a second retaining element 20 formed integrally with the first member.

Preferably, the hinge elements (17 and 19) each comprises an enlarged boss-like portion 21 and a leg portion 22 enclosing an opening 23 therein, while each retaining element (18 or 20) comprises a hook-like member having an undersurface 24 complementary to the leg portion 22 (of the hinge element) and forming a bearing surface therewith as shown more clearly in FIGURE 13.

The respective hinge elements and retaining elements are preferably (but not necessarily) mirror images of one another. Also, the elements need not be alternated throughout, but only on one set.

To disassemble one of the side members 12 from the tray member 11, see FIGURES 10–12 and 14–15, the operation is as follows: The side member 12 is pivoted down towards the tray 11 by a desired degree (preferably by an appreciable degree) so that each hook-like retaining element (18 or 20) clears its respective leg portion 22 of the hinge elements (17 or 19). The side member 12 is then slid longitudinally of the tray member 11, see FIGURE 15, thereby exposing the hinge elements. In this position, the dimensions are preferably such that the length of each hinge element (17 or 19) is greater than the corresponding longitudinal distance between the first retaining element and the second hinge element on the other member, so that, preferably, a slight interference fit is created, which may be manually overcome by snapping the respective hinge elements out of place, it being appreciated that the molded plastic material is sufficiently pliable or flexible to accommodate this action. An interference fit need not be created on all of the sets of hinge elements, only on at least one set.

The latching means 16, see FIGURES 17–22, preferably comprises a first land 25 formed integrally with one of the side members 12; the first land 25 has a first portion 26 (preferably centrally of the recesses 14) which is formed adjacent to the common plane 27 between the side members and a second portion 28, spaced longitudinally away from the first portion 26, and extending transversely beyond the common plane to overlap the other side member 12. A second land 29 is formed in the other side member 12, complementary to the first land 25. This second land 29 likewise has a first portion 30 (centrally located) formed adjacent to the common plane and further has a second portion 31, spaced longitudinally away from its first portion 30 in a direction opposite to the respective second portion 28 of the first land 25 and also extending transversely beyond the common plane to overlap the one side member 12. The respective first and second portions of the lands join substantially together, the respective first portions joining substantially together at the common plane; and a latch 32 is slidably mounted on at least one of the lands for movement over the respective first portions (26 and 30) of the lands, thereby preventing the side members from separating one from another.

Obviously, many modifications may be made without departing from the basic spirit of the present invention; and accordingly, within the scope of the appended claims, the invention may be practiced other than has been specifically described herein.

I claim:

1. In a plastic case of the type which comprises at least one pair of members, means to hinge said members together, comprising, in combination:
    (a) a first hinge element formed integrally with one of said members;
    (b) a first retaining element formed integrally with the other of said members to cooperate with said first hinge element;
    (c) a second hinge element formed integrally with the other of said members and spaced longitudinally of said first retaining element;
    (d) a second retaining element formed integrally with said one member, spaced longitudinally from said first hinge element, and cooperating with said second hinge element; and
    (e) each set of respective hinge elements and cooperating retainer elements having means included therein for preventing longitudinal sliding movement between said respectve elements until said members of the case have been pivoted a certain degree with respect to each other.

2. The combination of claim 1, wherein:
    (a) said first hinge element has a respective length which is greater than the complementary longitudinal distance between said first retaining element and second hinge element, whereby a slight interference fit is created tending to maintain said members in engagement even after longitudinal sliding movement therebetween, said interference fit being manually overcome to separate said members one from another.

3. The combination of claim 1, wherein:
    (a) said first hinge element on said one member abuts against said second hinge element on said other member to limit the longitudinal sliding movement between said members during assembly and disassembly of said members.

4. The combination of claim 1, wherein:
    (a) said hinge elements are mirror images of one another; and wherein
    (b) said retaining elements are mirror images of one another.

5. The combination of claim 1, wherein each hinge element comprises:
    (a) an enlarged boss portion;
    (b) a leg portion formed integrally with said boss portion; and
    (c) said hinge element having an opening between its leg portion and the member of the case.

6. The combination of claim 5, wherein said retaining element comprises:
    (a) a hook having an undersurface formed complementary to said respective leg portion of said mating hinge element, thereby forming a bearing surface for said respective leg portion.

References Cited by the Examiner

UNITED STATES PATENTS

| | | | |
|---|---|---|---|
| 2,168,677 | 8/1939 | McKeen | 292—145 |
| 2,297,091 | 9/1942 | Wells | 292—145 |
| 2,487,174 | 11/1949 | Petre | 206—16 |
| 2,570,341 | 10/1951 | Hake | 220—31 |
| 2,685,363 | 8/1954 | Falk et al. | 206—16 |
| 3,061,137 | 10/1962 | Svoboda et al. | 220—31 |

LOUIS G. MANCENE, *Primary Examiner.*